Jan. 25, 1966 H. HOERNER 3,231,379

METHOD FOR MAKING PRINTING FORMS AND MOLDS

Filed March 21, 1960

INVENTOR.

Hans Hoerner

BY

Curtis, Morris & Safford

ATTORNEYS

United States Patent Office 3,231,379

Patented Jan. 25, 1966

3,231,379

METHOD FOR MAKING PRINTING FORMS AND MOLDS

Hans Hoerner, Munich-Unterhaching, Germany

Filed Mar. 21, 1960, Ser. No. 16,320
Claims priority, application Germany, Apr. 6, 1959, H 36,044
4 Claims. (Cl. 96—35)

This invention relates to a method of making printing forms and molds having raised elements.

The copending application of Roman Freundorfer and Hans Hoerner, Serial No. 856,542, filed on December 1, 1959, now U.S. Patent 3,060,027, describes a method of making printing forms such as printing plates or blocks suitable for use in either relief- or gravure-printing processes. These forms are prepared by sensitizing a polyamide blank, exposing the sensitized blank to an image, and developing the exposed blank by a combined chemical and mechanical treatment. The process results in the production of printing forms in which the raised elements of the forms have tapered sides, giving the elements a preferred conical shape.

The process described in said copending application involves the sensitization of a body of a polymer or copolymer, preferably a natural or synthetic polymer or copolymer of a polyamide, with a sensitizing substance such as chromate or bicromate, a diazo compound, or iron compounds known to affect a polymer body by hardening or tanning it on exposure to light. The sensitized body, conveniently in the form of a sheet, plate, or foil, is next exposed to strong light through a suitable line- or screen-image, either positive or negative, and is then developed. In the development, the non-hardened or untanned portions of the polymer are softened by the influence of chemicals, and the softened, unexposed portions are removed by gentle mechanical abrasion. Those portions of the plate hardened by exposure to light do not soften in the presence of the developing solution and are resistant to mechanical removal.

The development of the exposed plate uses a process in which both chemical and mechanical effects are involved. The plate is treated with a developing solution which softens, and may swell, but does not dissolve, the unexposed material. The plate is mechanically abraded to remove the softened portions. Although alternate steps of softening and abrading can be employed, generally with repetition, the development is most conveniently done by rubbing the exposed plate with a material, such as plush or sheared velvet, having a plurality of fine, flexible sharp bristles moistened with the developing solution. A plush tampon is most often used in the developing process.

According to the method described in said copending application, the development of large surfaces of the sort that are occasionally desired in printing forms, molds for forming pastes, molds used in the porcelain industry, and so forth, which surfaces have grooves deeper than about 0.5 millimeter, requires round-about and time-consuming treatment of the exposed plate.

It has been found that deep grooves of this sort can be produced in a simple manner when the unexposed (and, therefore, unhardened) portions of the polymer are mechanically removed by brushing with a pad or cushion containing a gas and/or liquid which acts to equalize pressure over the surface being treated. The greater the distance between the hardened raised elements remaining on the polymer form, the greater will be the removal of material and the depth of the grooves between the elements. Surprisingly, the sharp edges of the raised elements remaining are not harmed by this treatment.

The pad or cushion is preferably a thin-walled body made from thin sheets of a pliable material, for example rubber, and contains air or another gas, and/or a liquid such as water. The use of pliable solid foams of all kinds is included in this concept. If the pad is filled with the same fluid which is used as a developing agent, no problems arise from the diffusion of liquids in either direction through the walls of the pad.

Although the fluid-filled pad can be used alone for developing, it has been determined that a much shorter working time results if a thin layer of an absorbent material is interposed between the polymer surface being developed and the pressure equalizing cushion. A foam material or fabric, particularly a fabric having an open weave, can be used. It is also advantageous to use a pad having a rough, granular, or scarified surface.

The use of a pad or cushion comprising a plurality of articulated segments has also proved advantageous. When surfaces of large area are being treated, a composite pad of this sort will lie flat more readily than a single unarticulated fluid-containing pad. Also, when the surface which is to be developed by rubbing rests simultaneously on several small individually operative pads, annoying shaking back and forth is avoided. At the same time, a more uniform equalization of pressure results, giving a gentler brushing action which is less detrimental to the edges of the remaining raised elements.

The primary advantage of the use of developing pads which equalize pressure over the surface area being developed is that the raised elements remaining on the developed surface retain the sloping side walls which give them their conical form; in the regions between the raised elements, a particularly deep groove is developed between those elements which are widely separated. This is advantageous, for example, in the preparation of relief printing plates because the stability of the printing elements assures a smooth acceptance and release of ink. The form of the sloping sides of the raised elements can be altered by using materials of different textures and thicknesses for the moistened layer containing the developing solution, and by varying the pressure used during the removal technique.

A fuller appreciation of the invention and its many advantages can be had by referring to the accompanying drawings, in which FIGURE 1 is a perspective view, in section, of a fluid-containing thin-walled cushion;

FIGURE 2 shows pad 21 of a pliable solid foamed composition such as foam rubber having thereover layer 22 of an absorbent material such as a fabric or pliable foamed composition, shown in the drawing as a plush fabric.

Figure 1:
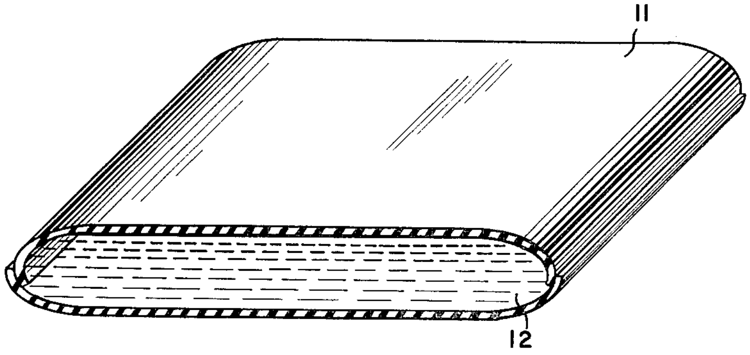
FIGURE 1 shows a thin-walled cushion comprising pliable outer covering 11, for example of rubber, and fluid 12, for example water, therein.
Figure 2:
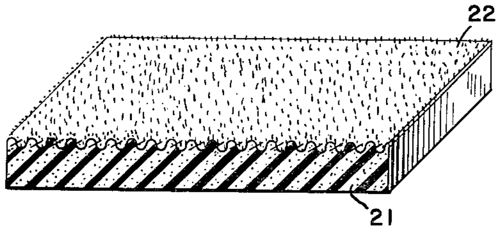
FIGURE 2 is a perspective view, in section, of a foamed composition pad covered in part with an absorbent layer.
Figure 3:
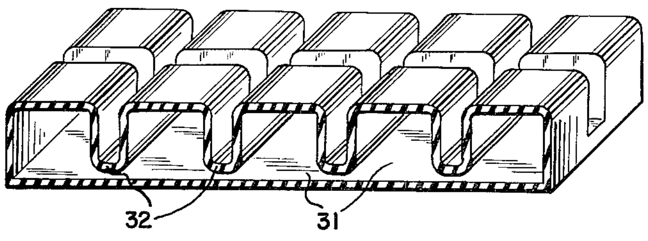
FIGURE 3 is a perspective view, in section, of a fluid-containing articulated thin-walled cushion.

FIGURE 3 shows a thin-walled cushion comprising a plurality of air-filled compartments 31 articulated by connecting segments 32. Although compartments 31 are shown as cubic, and as open to one another through segments 32, this shape is not critical and the individual compartments may be wholly closed.

*Example 1*

A cushion made of an especially pliable sheet of foam latex 25 mm. thick and having a circular form with a diameter of 700 mm. was covered with a sheet of a synthetic silk plush, the fibers of which had a length of from 2 to 3 mm., without impairing the flexibility and the pressure equalizing properties of the cushion.

A treated and exposed polymer plate was rubbed over the cushion, the surface of which had been moistened with a developing agent for the polymer. In this manner, those portions of the polymer which had not been hardened by light were mechanically removed. The depth of the removal was proportional to the spacing of the raised printing elements one from another, an effect caused by the pressure equalizing action of the cushion.

*Example 2*

A cushion having a surface area of about 0.5 $m.^2$, made from a thin sheet of rubber and comprising a plurality of air-filled cubic segments each 50 mm. on a side, was covered with a synthetic plush fabric having fibers from 2 to 3 mm. long. A sensitized and exposed plate comprising a polymeric material was moved across the cushion, the surface of which had been moistened with a developing agent for the polymer. The parts of the high polymer not hardened by light were removed by mechanical abrasion such that the depth of the portions removed between the printing elements were substantially proportional to the distance between the elements.

Although specific embodiments have been shown and described, it is to be understood that they are illustrative, and are not to be construed as limiting on the scope and spirit of the invention.

What is claimed is:

1. In a photomechanical method for preparing printing forms and molds having conical printing elements by exposing to light a body of polyamide polymer light sensitized with a light-sensitive hardening agent for said polymer, whereby those portions of the polyamide body exposed to light are hardened, and subsequently developing said polyamide body by repeatedly softening and abrading unhardened surface portions of the polyamide body while moistening said body with a softening agent for said polyamide, whereby unhardened portions of said body are partially removed to leave conical printing elements comprising exposed and hardened portions and unremoved unhardened portions, the improvement of repeatedly softening and abrading unhardened surface portions of the polyamide body by frictionally contacting the body directly with the surface of a pliable pressure-equalizing cushion moistened with said softening agent, said cushion consisting essentially of a gas-filled thin-walled body made from thin sheets of a pliable material.

2. The process as in claim 1 wherein said pliable cushion has rough surface portions.

3. The method as in claim 1 wherein said pliable cushion is a gas-filled thin-walled bag of pliable rubber.

4. The process as in claim 1 wherein said pliable cushion comprises a plurality of articulated gas-filled segments.

References Cited by the Examiner

UNITED STATES PATENTS

| | | | |
|---|---|---|---|
| 1,773,335 | 8/1930 | Ames et al. | 96—116 |
| 2,614,927 | 10/1952 | Broughton et al. | 96—66 |
| 2,772,160 | 11/1956 | Hepher | 96—35 |
| 2,927,021 | 3/1960 | Sorkin | 96—35 |
| 2,997,391 | 8/1961 | Murray et al. | 96—35 |
| 3,060,027 | 10/1962 | Freundorfer et al. | 96—115 |
| 3,081,168 | 3/1963 | Leekley et al. | 96—35 |

FOREIGN PATENTS

| | | |
|---|---|---|
| 801,093 | 9/1958 | Great Britain. |

OTHER REFERENCES

Horder, The Ilford Manual of Photography, London (1958), p. 428.

NORMAN G. TORCHIN, *Primary Examiner.*

PHILIP E. MANGAN, *Examiner.*